United States Patent [19]
Colpoys

[11] 3,985,971

[45] Oct. 12, 1976

[54] TELEPHONY

[76] Inventor: John R. Colpoys, 10 Thunderbird Drive, Ballston Lake, N.Y. 12019

[22] Filed: July 22, 1974

[21] Appl. No.: 490,879

[52] U.S. Cl. ............................................ 179/18 BG
[51] Int. Cl.² .......................................... H04M 3/48
[58] Field of Search ............................. 179/18 BG

[56] References Cited
UNITED STATES PATENTS

| | | |
|---|---|---|
| 3,584,156 | 6/1971 | Beth .............................. 179/18 BG |
| 3,626,107 | 12/1971 | Armstrong ................. 179/18 BG X |

Primary Examiner—William C. Cooper

[57] ABSTRACT

Relay trees connected to modified connector switches provide call-waiting service on a connector-group basis in step-by-step telephone switching systems. The subscriber's line is connected to an auxiliary line relay which functions to connect the line to the usual line circuit and bank terminals when normal, and to an auxiliary connector bank terminal when the relay is operated. Additional brushes added to the connector allow connection to the auxiliary bank terminal and to the regular bank terminal simultaneously.

1 Claim, 4 Drawing Figures

TELEPHONY

This circuit arrangement provides service for customers in a connector group so arranged, which is substantially equivalent to a key-set telephone with two lines to the exchange and bi-directional trunk-hunting.

References Cited

| | | | |
|---|---|---|---|
| U.S. Pat. No. 3,626,107 | 12/7/71 | Armstrong Bergquist | 179/18BG |
| U.S. Pat. No. 3,517,139 | 6/30/70 | Whitney | 179/18BG |

CALL WAITING ARRANGEMENT FOR STEP BY STEP TELEPHONE SYSTEMS

Brief Description

Call-waiting is a type of telephone service which provides an audible signal to a subscriber while his telephone is in use, and another caller is trying to reach his station. The subscriber so advised can become connected to the new incoming call by depressing his hookswitch for a brief interval. Again, he can return to the first call by repeating the hookswitch operation, and can alternate between the two calls by subsequent hookswitch operations.

From this, it is apparent that a mode of operation has appeared which involves three parties; a central party, a party to whom he can be in conversation, and a party he has on "hold". In the arrangement herein described, if one of the calling parties should disconnect, a 2-party connection will remain.

Whenever a 2-party connection is operative, a new call may appear to the subscriber with this service, at which time, the 3-way mode reappears.

To illustrate this capability, it may be envisioned that a central party could originate a call, and then receive numerous calls without ever "hanging-up", except for a 3-second "on-hook" to disconnect the originated call and "flashing" briefly to answer succeeding incoming calls.

This service increases the value and convenience of the telephone because fewer calls are lost or blocked by line-busy conditions.

Call-waiting service is presently available in various central office equipment types, but is most economically provided by shared equipment typical of common control or electronic processor controlled central offices. Considerable investment rests in step-by-step equipment insuring its survival for some years to come. It is, therefore, a purpose of this invention to enable call-waiting service to be furnished economically with shared or common equipment units in step-by-step systems.

This invention proposes to create a connector group with call-waiting service available, but not mandatory, to all customer lines in the group.

Each line in a call-waiting connector group will be equipped with an additional relay. Each connector in the group will be modified and its usual functions expanded by the applique circuit herein described.

The equipment arrangement described herein differs radically from that cited in the reference patents, and the service rendered is, to a degree, superior even to that offered by the most sophisticated electronic offices such as the Western Electric No. 1 ESS.

Some differences between the service rendered by this equipment versus other equipment arrangements are:

1. This equipment does not exclude an incoming call from being introduced while the called line is originating a call. Dialing and call origination time is allowed.
2. If the called line fails to hear or recognize that he has a call-waiting and disconnects, his phone will ring.
3. There is automatic protection against losing incoming calls because of a "calling party hold" condition. A second connector reaching a line being held in this condition, will ring the station.
4. More reliable service should accrue from this arrangement versus per-line equipment. Common equipment troubles can be more easily tested, isolated, and by-passed.
5. A 10-second wait always occurs before a call-waiting call is announced. This eliminates "barge-in", and gives any call in progress a chance to pass through the introductory stage.
6. Additional line number usage is not a requirement of this arrangement.
7. A unique service may be provided to a customer by assigning two line numbers to a line, one in a modified group and one in a non-modified group. The number in the modified group (non-listed perhaps) would provide call waiting service, while the number in the non-modified group would not.

Although the equipment arrangement described in the preferred embodiment is intended to be workable and demonstrable, the concept of the invention should not be thought to be restricted or limited to this exact specification. For example, in practical use it may be advantageous to replace the described connector and applique with a single unit comprising all the functions detailed herein.

The operating characteristics of the component parts have not been described because all elements are commercially available. For example, the relays are all electrically operated by direct current of either polarity. The timing circuits are two terminal solid-state switches which take a specific time to close through, and release upon the withdrawal of potential.

Circuit details, fundamental to practical application but not necessary to the principle theme have been omitted for brevity and clarity.

GENERAL DESCRIPTION

The preferred embodiment of the invention will now be described using the accompanying schematic drawings as references, in which:

FIG. 1 is a block diagram showing a call-waiting connector and its relationship to other equipment units and customer lines in a step-by-step telephone exchange. A dashed line separates the equipment needed to equip the central office with call-waiting service, and this can be done on a connector group basis.

FIGS. 2, 3 and 4, are segments of the call-waiting circuit drawn schematically on detached-contact type drawings described in previous U.S. Patents, among them U.S. Pat. No. 3,517,139.

This invention will be described first in a general way with emphasis on components, functions and arrangement. Secondly, a description of all the circuit sequences which can take place will be detailed. As in the preceding, no attempt will be made to explain common telephone terminology that is well known to people skilled in the art.

BLOCK DIAGRAM, FIG. 1

As shown in this sketch, the auxiliary line circuit 15 is connected between the subscriber's line and the usual step-by-step central office terminals: line finder bank 12, line relay 17, and connector bank 13. Also, connected to the auxiliary line circuit, is a path to a mate connector terminal 14. The path 15 to 14 will be used whenever an incoming call finds the line in use, and a call-waiting connection is to be established, and also when an incoming call finds the line idle and rings the station. Upon answering, however, this path is abandoned.

An important distinction should be made at this point concerning the mate connector terminal. Unlike other arrangements, the connector terminals associated with a particular line in this application are at the same bank coordinates, and not adjacent to each other as are terminals in a rotary hunting group.

APPLIQUE PART — FIG. 2

This figure groups the relays that function to sense call conditions present in the connector and sleeve terminals of the line to which the connector is dialed. The (E) relay is slaved to the connector relay which is operated while the connector is stepping in rotary on the final digit dialed. Its operation will prepare for testing the busy/idle status of the line dialed and its release will start call processes after the line has been tested. The (ON) relay will operate when the (E) operates and remain operated until the connector releases. It furnishes many relay operating paths which release at the release of the associated connector. The (F) relay duplicates in this circuit, the ring-tripping relay function in the associated connector.

The sleeve bank terminals are shown as item 29 for the primary bank sleeve terminal and item 26 for the auxiliary bank sleeve terminal.

The S2 relay is assigned on a per-line basis and its function is to direct the subscriber's line to either the normal central office line circuit configuration, or to the auxiliary bank of the call-waiting connector when required.

The G1 relay records that the primary bank is busy while the G2 does the same with the auxiliary bank. (The primary bank is busy if a line has a single call in progress. The auxiliary bank will be busy also if the connector is ringing a line, or a connector has a call waiting.)

The (SH) and (SH1) relays operate if the line called is busy on its prime bank and idle on its auxiliary bank. The (SH) relay serves to enable the circuit-splitting action required for call waiting. Once operated, the SH1 relay prepares a path to guard the sleeve if the prime bank is vacated by a preceding call and circuit splitting operation is no longer required. The (K) relay in the existing apparatus serves to connect transmission circuits in the connector to the outgoing T-R path 33 shown on FIG. 3. The (G) relay returns busy tone to the calling subscriber. Relays in the connector that are not depicted herein retain their usual functions.

APPLIQUE PART — FIG. 3

This part of the applique functions as a 3-port switch. Terminals 33 connect to the outgoing transmission path of the associated connector. Terminals 31 represent the connection to the bank wipers associated with the prime bank. Point 38 depicts the connection to the bank wipers which are associated with the auxiliary bank. Various connections are made to connect each port to its proper path at the proper time.

APPLIQUE PART—FIG. 4

The equipment shown herein becomes active if the callwaiting pattern is established by operation of the (SH) relay. Timing circuit 41 times the operation of the (BP) relay which furnishes the "beep" signal to notify the called line that a call is waiting. The (TN) relay in conjunction with timing circuit 44 times the duration of the "beep." The (FL) relay is timed by circuit 42 to 150 milliseconds to distinguish the flash from dial pulses. Timing circuit 43 times for 1.5 seconds to distinguish a disconnect from a flash. The (DC) relay records the disconnect and terminates all further action of equipment in this figure and itself releases upon the release of the connector. The (W) and (CT) relays act as a toggle and serve to switch the call path under the control of flashes.

DETAILED DESCRIPTION

Figure 1:
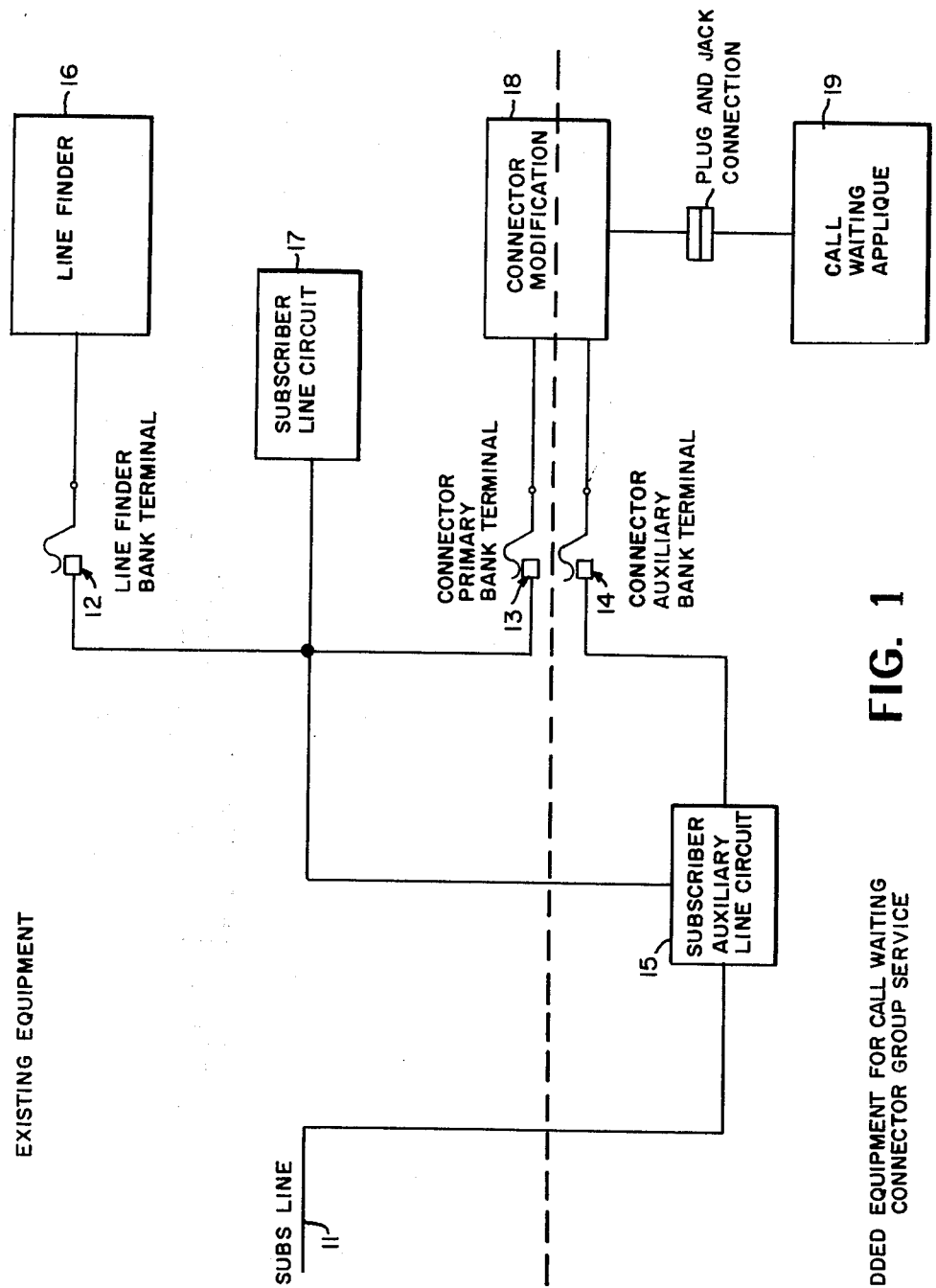
Figure 2:
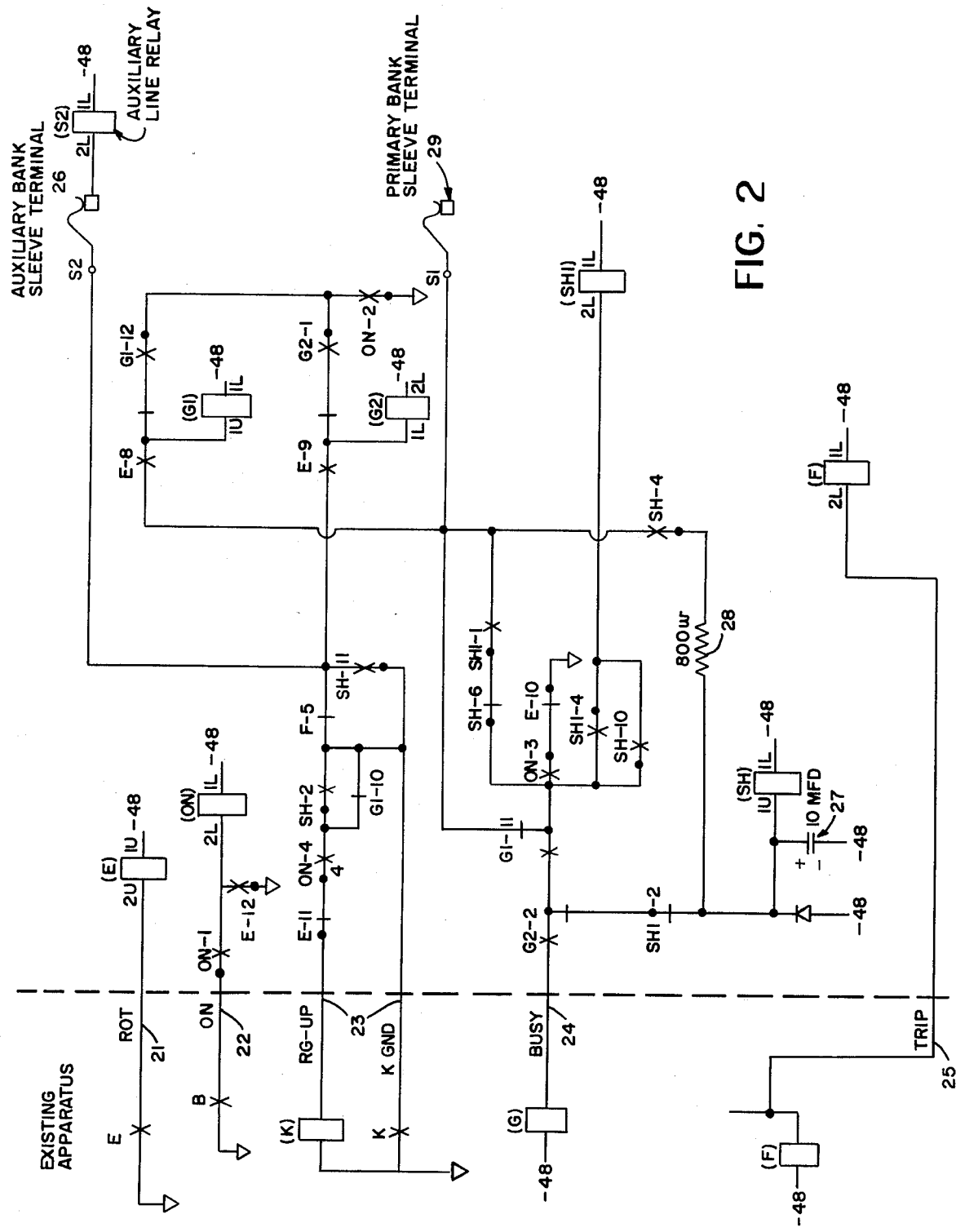

In the following detailed circuit description, the circuit paths may be found readily by considering the function. Indications to and from the associated connector and the line sleeves will be found on FIG. 2. Transmission paths are shown on FIG. 3. Timing controlled circuits are found on FIG. 4.

A-1 Seizure

The circuit applique is enabled by the action of the associated connector in rotary stepping. Ground from the ROT 21 lead in the connector is connected to the 2U winding of the (E) relay to battery at the 1U terminal. When the (E) relay operates, the (ON) relay will operate from ground through contact E-12 to the 2L winding of the (ON) relay to battery on the 1L winding terminal. A locking ground on lead ON22, through contact ON-1 insures that the (ON) relay remains operated as long as the connector is held operated.

Operation of the (E) relay connects the sleeve wipers (brushes) to the windings of the (G1) and (G2) relay through contacts E-8 and E-9 respectively. This prepares the circuit to take action when the line dialed is reached.

Note A-1

It is important to note that all circuit operations after seizure depend upon the connector being held operated by the calling line. If the calling line should disconnect at any time, this circuit, along with the associated connector, will release completely, no matter what operation sequence is in progress.

(Assume that the called line is idle, otherwise skip to section B-1)

A-2 Called Line Idle

When the connector wipers come to rest on the line dialed, a circuit is completed from battery at the 1U terminal of the G1 relay to the sleeve of the primary bank associated with the line dialed. If that terminal is idle, battery will be present at that point also, and the G1 relay will not be operated.

After a brief interval, the (E) relay will be released by the connector opening the ROT 21 lead. Release of the (E) relay forms a circuit path as follows: Ground through a winding of a relay in the connector (arbitrarily called the (K) relay) is connected to the RE-UP 23 lead, through the normal contact E-11, contact ON-4, normal contact G1-10, normal contact F-5, to the sleeve of the auxiliary bank. This operates relay S2 of the subscriber's line circuit and the (K) relay in the connector.

Figure 3:
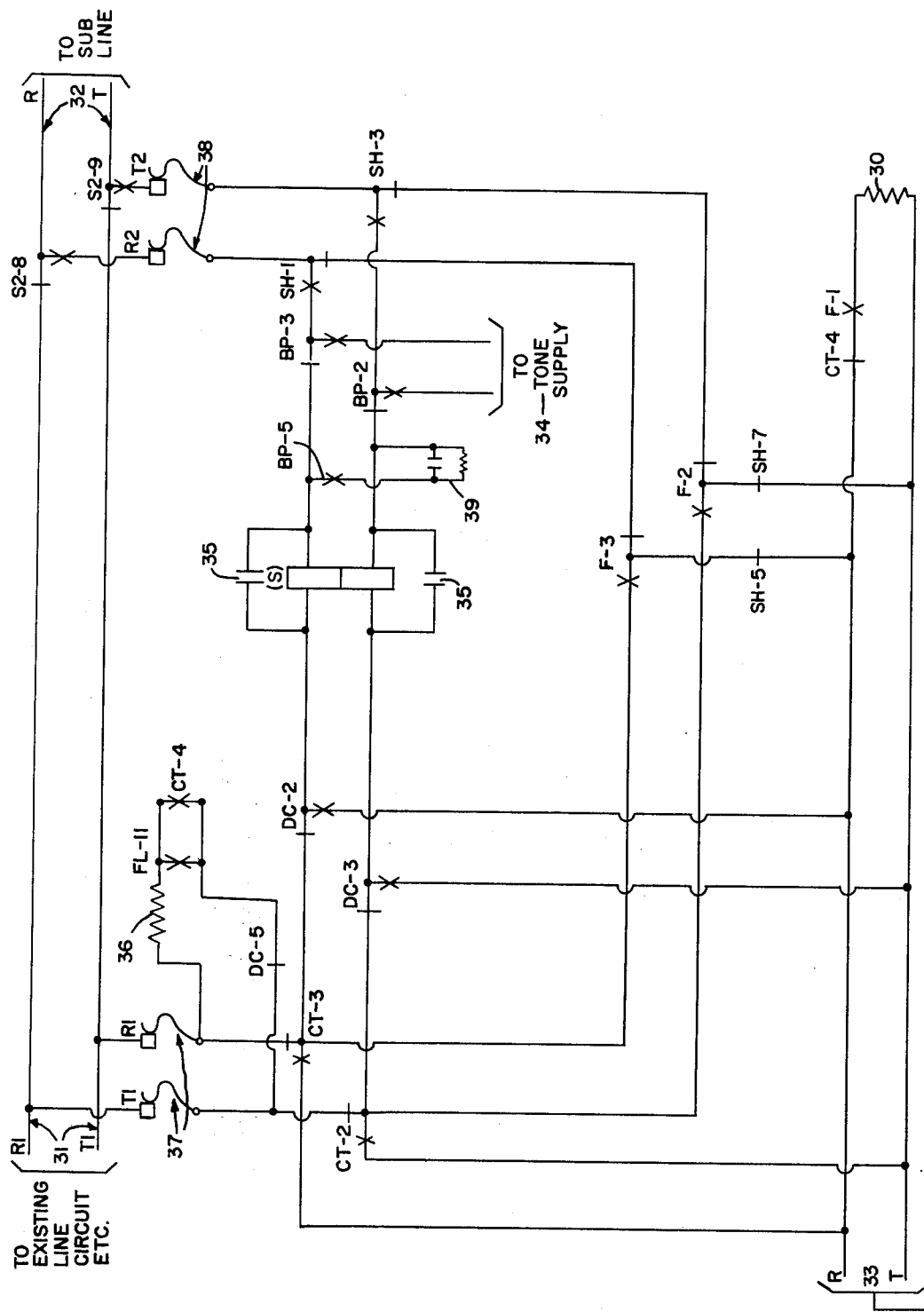
Figure 4:
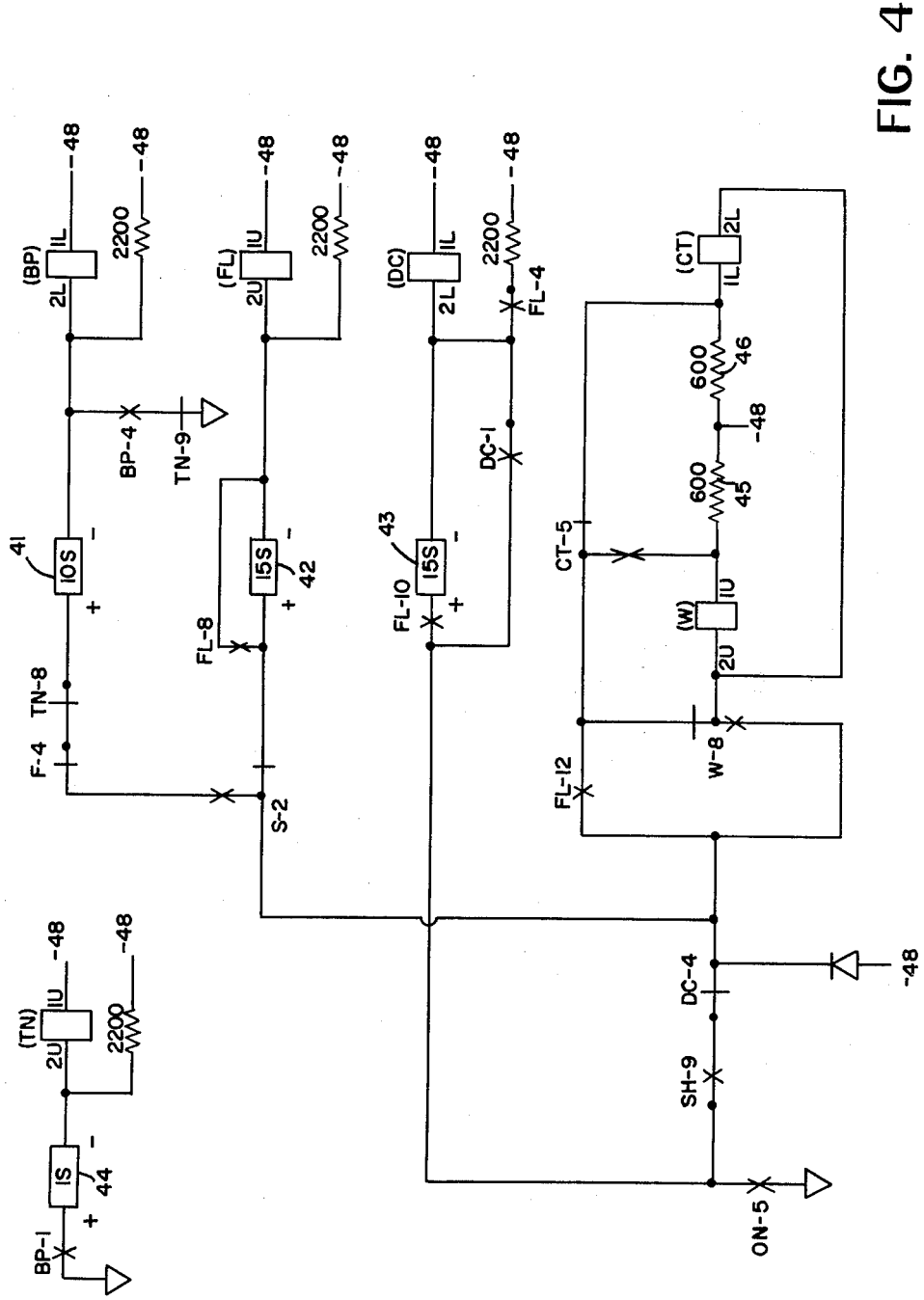

When the (K) relay in the connector operates, a circuit is complete to ringing voltage which enters this circuit over the T and R leads 33, in FIG. 3. Ringing voltage is connected through normal contacts SH-5 and SH-7, normal contacts F-2 and F-3, normal contacts SH-3 and SH-1, the T2-R2 bank terminals, through operated contacts S2-9 and S2-8 to the subscriber's line to ring his station.

The calling line is furnished audible ringing signal via the normal capacitive-coupled feedback path in the connector.

A-3 Called Line Answers

When the called line answers, the path described in A-2 allows current to flow to operate the tripping relay in the connector. This removes ringing current and provides the usual voice transmission circuit to the calling party.

Release of the auxiliary bank can now take place to allow the called line to receive another call from another connector, via the call-waiting method. The (F) relay operates simultaneously with the tripping relay in the connector over the TRIP 25 lead. Voice transmission is from the connector T-R leads 33, normal contacts SH-5 and SH-7, through operated contacts F-2 and F-3, normal contacts CT-2 and CT-3, T1-R1 wipers to the primary bank 37. The operating path of the S2 relay, described in section A-2, is released by operation of the F-5 contact. This call path will remain until the calling line disconnects or another connector in the group seizes this particular line. If another connector is dialed to this same line, the S2 relay will be operated by that connector and the call path will be switched by that connector, from the primary bank to the auxiliary bank, at that switch unit.

A-4 Calling Line Disconnects

When the calling line disconnects, the associated connector releases, releasing the ground on lead ON 22, and TRIP 25 leads. This allows the (ON) and (F) relays to release, completely normalizing the circuit.

A-5 Calling Party Hold

If the calling party fails to disconnect when the called party does, the called party is blocked from making an outgoing call as in normal service. However, with this call waiting arrangement, an incoming call is completed as follows: Another connector will stop on his line terminals and operate the S2 relay as described in section A-3. The call path is switched from the prime bank to the auxiliary bank through that connector. After about 1.7 seconds, as explained in section D-1, this connector will detect an on-hook line condition and ring that station. This can happen repeatedly, one call after another.

Should the call responsible for the calling-party-hold condition release, all circuits will restore to normal as described in A-4. (The following section assumes that the primary bank is busy when dialed and the auxiliary bank is idle. If the reader wishes to consider both the primary bank and auxiliary bank busy, skip to section C-1).

B-1 Establishing Call-Waiting

If after the circuit action described in section A-1, the connector finds the sleeve of the primary bank grounded, indicating that a switch is already connected to the called line, the G1 relay will be operated by ground from the sleeve of the primary bank terminal, through operated contact E-8 to the 2U winding terminal of the G1 relay to battery at the 1U terminal. After the (E) relay releases, a locking path for the G1 relay exists through normal contact E-8, operated contact G1-12, and operated contact ON-2.

A similar circuit exists from the auxiliary bank terminal to the G2 relay. However, in this assumption, the terminal is not grounded and the G2 relay will not operate.

A path now exists from ground through normal contact E-10, operated contact ON-3, operated contact G1-11, normal contact G2-2, normal contact SH1-2, to the 1U winding of the (SH) relay, to battery on the 1L winding terminal. This operates the (SH) relay which branches this ground to the (SH1) relay through the SH-10 contact. The SH1 relay now operates and locks through contact SH1-4 to the same branch. Upon the operation of the SH1 relay, the (SH relay will hold to the sleeve ground which initialized this condition and that path is through resistor 28 and operated contact SH-4.

Audible ringing tone will be returned to the calling subscriber, but the ringing voltage appearing at the T-R leads 33 will have no path to the called line. By the operation of the S2 relay, the called line will be switched in an uninterrupted fashion to the T2-R2 wipers 38. A complete circuit from this point to the prime bank exists through operated contacts SH-1 and SH-3, normal contacts BP-2 and BP-3, upper and lower windings of the (S) relay, normal contacts DC-2 and DC-3, normal contacts CT-2 and CT-3, wipers 37, to the T1-R1 bank terminals.

Note B-1

The (S) relay is a low-power, low resistance relay shunted by 2MF capacitors 35, so that the impedance to transmission and supervision of the active call path just described is negligible.

Note B-1A

The call existing at this time on the primary bank is not under the control of this circuit and may release at any time. Such circumstances are described in Section D-1.

B-2 Called Line Is Signaled That Another Call is Waiting

As described in section B-1, the (S) relay is in series with the line and monitors whether the line is on or off-hook. If the line does not generate any dial pulses, flashes or disconnects for 10 seconds, the (BP) relay operates as follows: Ground from operated contact S-2, normal contact F-4, normal contact TN-8, and timer 41, to the 2L winding terminal to battery on the 1L terminal of the (BP) relay. The relay will lock through contact BP-4 and TN-9. A circuit is closed to timer 44 and after 100 milliseconds, the (TN) relay operates in series with this timer. The (TN) relay operates, releasing the (BP), which in turn releases the (TN).

The brief operation of the (BP) relay just described causes a spurt of tone to be transmitted to the called line through operated contacts BP-2 and BP-3. Contact BP-5 serves to hold a circuit forward during this brief interval. The tone heard by the calling line signifies that he has another call in waiting.

After the release of the (TN) and (BP) relays, unless an on-hook condition is detected, the "beep" tone will be repeated every 10 seconds.

(If the called party does not acknowledge the signal or disconnects before he has been given the beep signal, proceed to section D-1. If the called line "flashes" continue with the following sections.)

B-3 Called Line "Flashes"

When the called line goes on-hook for a period exceeding 150 milliseconds but not exceeding 2 seconds, a flash has been signaled. (If the line stays on-hook, for longer than 2 seconds, this is interpreted as a disconnect as explained in section B-4.)

Following the operation of the (SH) relay as described in section B-1, the supervisory relay (S) is functional, and when the called line goes on-hook, a circuit exists from ground through contact ON-5, operated contact SH-9, normal contact DC-4, normal contact S-2, timer 42, to the 2U winding of the (FL) relay to 1U battery.

Operation of the (FL) relay operates the (W) relay from battery through resistor 45 to the 1U winding to the 2U winding terminal, through the normal contact W-8, operated contact FL-12, normal contact DC-4, operated contact SH-9 to off-normal ground at contact ON-5. The (W) relay holding path is through the operated contact W-8, and this ground is also branched to the 2L winding terminal of the (CT) relay but a shunt exists from the operated contact FL-12, through the normal contact CT-5 to resistor 46 to battery. The (CT) will not at this time operate.

When the called line returns to off-hook at the end of the flash, the (FL) relay will release and remove the shunt from the (CT) relay allowing it to operate in series with resistor 46. Operation of the (CT) relay transfers the called line from wipers 37 to the connector transmission path 33.

Operation of the (CT) relay places a hold across the T1-R1 line by completing a path through resistor 36, and operated contact CT-4 and normal contact DC-5. Any call attached to the primary bank is given an off-hook signal just as though the called line interfaced it, and the station was off-hook.

When the transmission path is completed to the T-R 33 port, the station bridge "trips" the connector ringing and operates the (F) relay in the connector, and the (F) relay in the applique over lead TRIP 25. Operation of the (F) relay in the applique opens contact F-4 and inhibits further generation of the "beep" tone.

B-4 Return Flash

If the called line wishes to return to the call on the primary bank 31, another depression of the hookswitch is made. The (FL) relay operated as before, and a shunt is placed across the (W) relay winding via operated contacts FL-12 and CT-5 to battery through resistor 45. This shunt forces release of the (W) relay. At the end of the flash and the release of the (FL) relay, the (CT) relay will release because the holding path through operated contact W-8 is removed when the (W) released, and the normal contact W-8 path is free of ground as the FL-12 contact opens. Release of the (CT) relay allows the transmission path from the called line to return to the T1-R1 31 circuit. Release of the (CT) relay after the (F) relay has operated places a hold on the T-R 33 circuit via normal contact CT-4 and operated contact F-1.

Note B-4

The called party can flash and cause circuit sequences B-3 and B-4 as long as the other parties remain on-line.

C-1 Busy Line Indication

Subsequent to the call sequences described in sections A-1, A-2, and A-3, it may occur that the line dialed is busy on both the primary and secondary banks. Both sleeve 29 and sleeve 26 will be grounded and the G1 relay will be operated as described in section B-1. A similar circuit can be traced for the G2 relay.

When the (E) relay releases after the connector has settled on the line dialed, a circuit is completed from ground at contact E-10 to the operated contact ON-3, operated contact G1-11, operated contact G2-2 to the BUSY 24 lead. This path operates the relay in the associated connector which signals a "busy line" to the calling party.

Note C-1

Either of two conditions can cause both sleeves to be grounded; Another connector may be poised in call-waiting position or another connector might at this moment, be ringing the station.

Upon a disconnect by the calling party, the ON 22 lead holding the (ON) relay will open, and this starts the complete circuit release.

D-1 With the Connector in Call-Waiting Position, The Primary Bank Becomes Idle. (See Note B-1A)

If a connector has been dialed to a line that is busy on its prime bank but idle on its auxiliary bank, the (SH) and (SH1) relays will be operated as described in section B-1. The (SH) relay effectively monitors the prime bank and will release shortly after ground disappears from the prime bank sleeve. When the (SH) relay releases, this circuit takes control of the prime bank by completing a ground path from operated contact SH1-1, normal contact SH-6, operated contact ON-3, and normal contact E-10.

When the (SH) relay releases, the ringing path is cut through as described in section A-2, and further call sequences will progress from that point if the line is on-hook or section A-3 if the line is off-hook.

If a call waiting situation has progressed to the point that ringing has been tripped as in section B-3, the prime bank can become idle by the controlling party disconnecting. (See note D-1) If this should happen, the (SH) relay will release as before, however, the (S2) relay would then be released because contact F-5 would be open. The transmission path trough the primary bank is as described in section A-3.

Note D-1

The primary bank will be released if another connector in the group controlling the primary bank at this time, should release. Also, the primary bank can be released if the called party had made an outgoing call and his call controlled the primary bank, and a disconnect signal was sent forward.

A disconnect signal is generated by the called station going on-hook for about 2 seconds. When this happens, the following occurs: (The (FL) relay circuit becomes operative as explained in section B-3. Operation of the (FL) relay closes the circuit to timer 43 at contact FL-10. After about 1.5 seconds, the (DC) relay operates and locks through contact DC-1. The (DC) relay closes the transmission path through operated contacts DC-2 and DC-3 which is necessary if the primary bank is under other control and does not clear. This transmission path will be vacated if the primary bank connection has been under the control of the called party who has disconnected. The holding path to the prime bank is opened at the DC-5 normal contact. The (DC) relay operating also disables any further action in FIG. 4 by opening contact DC-4.

What is claimed is:

1. In a telephone system of the step-by-step type, a connector group means to provide call-waiting service with equipment units shared in common by all lines in said connector group comprising:
   a. A station line circuit arrangement including (1) a primary connector bank appearance, and an auxiliary bank appearance on upper and lower bank terminals, at equal switch bank coordinate position, and (2) an auxiliary relay providing direct circuit continuity from the station line to either said primary bank terminals or said auxiliary bank terminals.
   b. Connector switches modified to connect to said station line circuit with six brushes simultaneously, three at each of said equal upper and lower bank coordinate positions.
   c. Said connector switches further modified to incorporate (1) circuit means and configuration providing call-terminating service, as well as a means and configuration providing call-waiting service through said auxiliary bank appearance, and (2) circuit means responsive to primary and auxiliary bank supervisory signals originated by other switch units, and (3) circuit means supplying supervisory signals to primary and auxiliary bank terminals to which said station line circuit and other switch units may respond.
   d. Said modified connector switches when activated in said call-waiting configuration providing (1) a circuit path from said station line circuit auxiliary bank to said station line circuit primary bank, and (2) means to activate a circuit path from said station line circuit auxiliary bank to a call-waiting circuit path, and (3) circuit means reponsive to said station line supervisory signals in said (1) or (2) activated circuit paths, and (4) circuit means continuously responsive to supervisory signals present on primary bank terminals; said means capable of changing the transmission path of the call-waiting circuit path from the auxiliary bank to the primary bank if the primary bank otherwise becomes idle.

* * * * *